United States Patent
Jeong (10) Patent No.: US 8,072,354 B2
(45) Date of Patent: Dec. 6, 2011

(54) MOBILE VEHICLE NAVIGATION METHOD AND APPARATUS THEREOF

(75) Inventor: Eun-Hee Jeong, Seoul (KR)

(73) Assignee: LG Electronics Inc., Seoul (KR)

(*) Notice: Subject to any disclaimer, the term of this patent is extended or adjusted under 35 U.S.C. 154(b) by 394 days.

(21) Appl. No.: 12/412,115

(22) Filed: Mar. 26, 2009

(65) Prior Publication Data

US 2010/0004849 A1    Jan. 7, 2010

(30) Foreign Application Priority Data

Jul. 1, 2008  (KR) .......................... 10-2008-0063607

(51) Int. Cl.
*G08G 1/123* (2006.01)
*G01C 21/00* (2006.01)

(52) U.S. Cl. ............... 340/995.12; 701/213; 340/995.15

(58) Field of Classification Search .................. 701/200; 340/995.1–99.28
See application file for complete search history.

(56) References Cited

U.S. PATENT DOCUMENTS

| 6,850,844 | B1* | 2/2005 | Walters et al. ................ 701/216 |
| 2009/0117923 | A1* | 5/2009 | Berger et al. ................ 455/466 |

* cited by examiner

*Primary Examiner* — Gerald J. O'Connor
*Assistant Examiner* — Minnah Seoh
(74) *Attorney, Agent, or Firm* — Birch, Stewart, Kolasch & Birch, LLP (57) ABSTRACT

A method and device for updating map data of a navigation device. The method includes receiving information relating to an area update of the map data from a data server via a wireless broadcast to the navigation device; and displaying the information in graphical form on a map displayed on a display screen. The method may further include receiving a user input selecting an area on the map corresponding to the area update; wirelessly transmitting the area as an area selection to the data server; wirelessly receiving updated map information corresponding to the selected area from the data server; and loading the received updated map information into the navigation device.

11 Claims, 8 Drawing Sheets

MOBILE VEHICLE NAVIGATION METHOD AND APPARATUS THEREOF

CROSS REFERENCE TO RELATED APPLICATIONS

The present application is related to, and claims priority to, Korean patent application KR 10-2008-0063607, filed on Jul. 1, 2008, the entire contents of which is incorporated herein by reference.

BACKGROUND OF THE INVENTION

1. Field of the Invention

The present invention relates to a mobile vehicle navigation method and apparatus thereof.

2. Description of the Related Art

A related art mobile vehicle navigation apparatus is an apparatus which generates road guidance information based on a Global Positioning System (GPS) signal and map information, and provides the road guidance information to a user.

Figure 1:
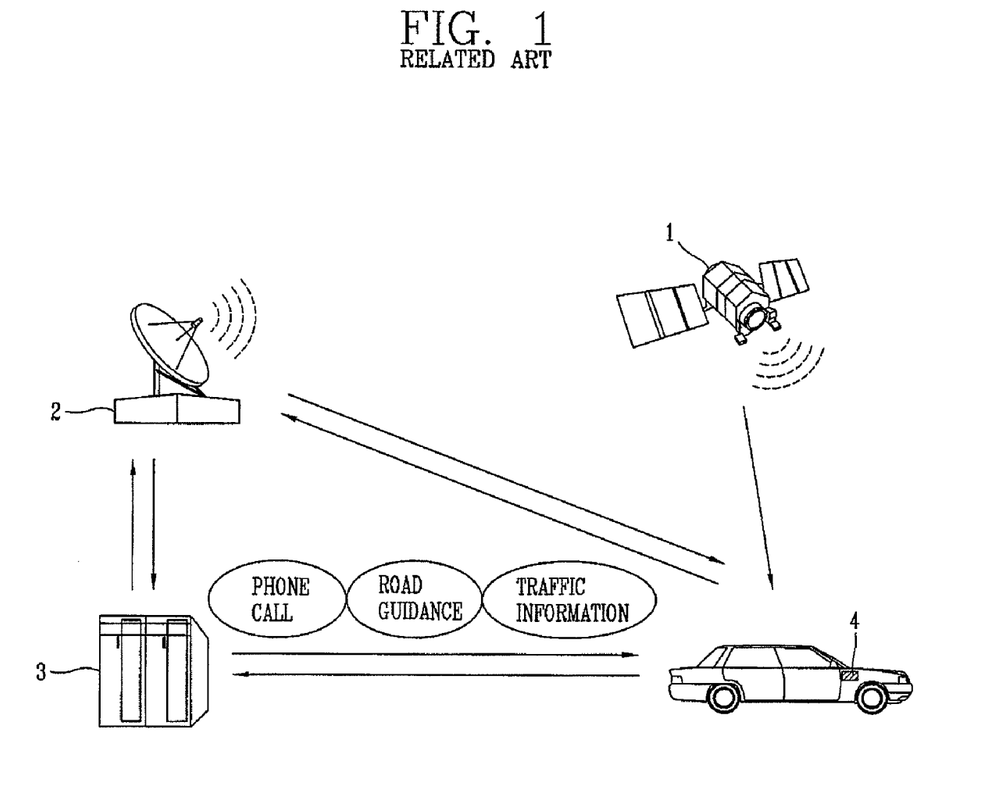
FIG. 1 is a block diagram showing a related art mobile vehicle navigation system.

FIG. 1 is a block diagram showing a related art mobile vehicle navigation system.

As shown in FIG. 1, the related art mobile vehicle navigation system may include an information providing center 3 for providing traffic information; and a mobile vehicle navigation apparatus 4 mounted inside a vehicle and for receiving traffic information through a wireless communication network 2 so as to provide a road guidance service based on a GPS signal received from an artificial satellite 1 and the traffic information.

SUMMARY OF THE INVENTION

The mobile vehicle navigation apparatus according to an embodiment of the present invention includes a communication unit configured to receive updated area information of map data, and a controller configured to notify the updated area information.

The mobile vehicle navigation method according to an embodiment of the present invention includes receiving updated area information only of map update data before updating map data; generating, based on the updated area information, graphic information including a map background data identifier for indicating a changed area on map background data, a map search data identifier for indicating a changed area on map search data, and a road network identifier for indicating a changed area on a road network; and displaying the graphic information on a display screen.

The mobile vehicle navigation method according to an embodiment of the present invention includes requesting, from an information providing center, the latest version information of a pre-stored map data through a wireless communication network upon request by a user or periodically; receiving, from the information providing center, the latest version information of the map data through the wireless communication network; comparing the latest version information of the received map data with version information of map data stored in a storage unit; if the version of the map data received from the information providing center is newer than the version of the map data stored in the storage unit, receiving, from the information providing center, updated area information of the map data in the latest version through the wireless communication network; generating, based on the updated area information, graphic information including a map background data identifier for indicating a changed area on map background data, a map search data identifier for indicating a changed area on map search data, and a road network identifier for indicating a changed area on a road network; and displaying the graphic information on a display screen.

The mobile vehicle navigation apparatus according to an embodiment of the present invention includes a communication unit configured to receive updated area information only of map update data before updating map data; a controller configured to generate graphic information, based on the updated area information, including a map background data identifier for indicating a changed area on map background data, a map search data identifier for indicating a changed area on map search data, and a road network identifier for indicating a changed area on a road network; and a display unit configured to display the graphic information on a display screen.

The mobile vehicle navigation apparatus according to an embodiment of the present invention includes a storage unit configured to store map data; a controller configured to request, from an information providing center, the latest version information of the stored map data through a wireless communication network upon request by a user or periodically, receive, from the information providing center, the latest version information of the map data through the wireless communication network, compare the latest version information of the received map data with version information of map data stored in the storage unit, when the version of the map data received from the information providing center is newer than the version of the map data stored in the storage unit, receive, from the information providing center, updated area information of the map data in the latest version through the wireless communication network, and generate graphic information indicating the updated area information; and a display unit configured to display the graphic information on a display screen. Here, the controller generates the graphic information, including a map background data identifier for indicating a changed area on map background data, a map search data identifier for indicating a changed area on map search data, and a road network identifier for indicating a changed area on a road network.

Other embodiments include a method and device for updating map data of a navigation device. The method includes receiving information relating to an area update of the map data from a data server via a wireless broadcast to the navigation device; and displaying the information in graphical form on a map displayed on a display screen. The method may further include receiving a user input selecting an area on the map corresponding to the area update; wirelessly transmitting the area as an area selection to the data server; wirelessly receiving updated map information corresponding to the selected area from the data server; and loading the received updated map information into the navigation device. Another embodiment is a device and a method of updating map data of a navigation device configured to be installed in one of a mobile terminal and a motor vehicle. The method includes receiving information relating to an area update of the map data from a data server via a wireless broadcast to the navigation device; and displaying the information in graphical form on a map displayed on a display screen.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, descriptions of a mobile vehicle navigation method and apparatus thereof, which allows a user to rapidly determine whether to update map data by generating graphic information and/or voice information notifying updated area information before updating map data, to update map data only of a required area among the map data, and further to accurately recognize map data to be updated by enlarging/reducing a specific area if the specific area is selected among areas within the graphic information, will be given with reference to FIGS. 2 through 9.

Figure 2:
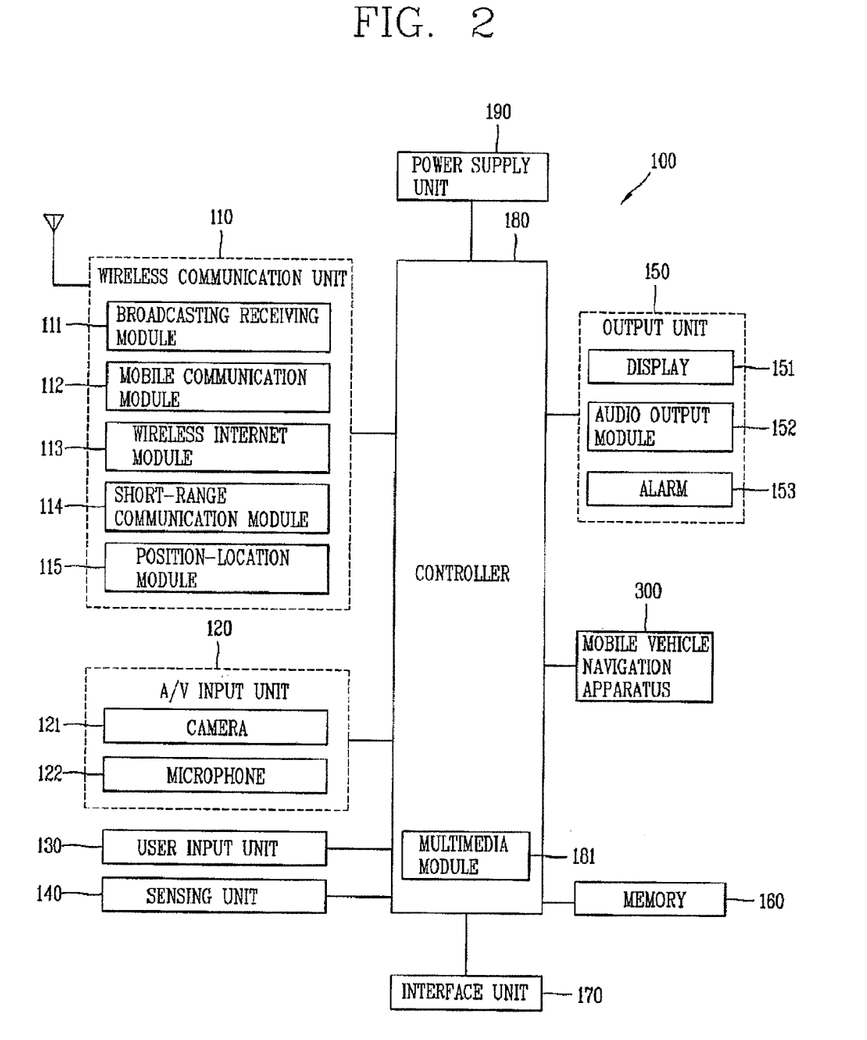
FIG. 2 is a block diagram showing a structure of a mobile terminal to which a mobile vehicle navigation apparatus according to an embodiment of the present invention is interfaced.

FIG. 2 is a block diagram showing a structure of a mobile terminal 100 to which a mobile vehicle navigation apparatus 300 according to one embodiment of the present invention is interfaced. The mobile terminal 100 may be implemented as various forms. For instance, the mobile terminal 100 may include portable terminals, smart phones, notebook computers, digital multimedia broadcasting terminals, Personal Digital Assistants (PDA), Portable Multimedia Players (PMP), navigations (mobile vehicle navigation apparatus), and the like.

As shown in FIG. 2, the mobile terminal 100 may include a wireless communication unit 110, an A/V (Audio/Video) input unit 120, a user input unit 130, a sensing unit 140, an output unit 150, a memory 160, an interface unit 170, a controller 180, a power supply unit 190, and the like. FIG. 2 shows the mobile terminal 100 having various components, but it is understood that implementing all of the illustrated components is not a requirement. Greater or fewer components may alternatively be implemented.

The wireless communication unit 110 may typically include one or more components that permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless internet module 113, a short-range communication module 114 and a position location module 115.

The broadcast receiving module 111 receives a broadcast signal and/or broadcast associated information from an external broadcast managing server via a broadcast channel. The broadcast channel may include a satellite channel and a terrestrial channel. The broadcast managing server may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may be provided via a mobile communication network, and received by the mobile communication module 112. The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as a memory 160.

The mobile communication module 112 transmits/receives wireless signals to/from at least one of network entities (e.g., a base station, an external mobile terminal, a server, etc.) on a mobile communication network. Here, the wireless signals may include audio call signal, video call signal, and/or various formats of data according to transmission/reception of text/multimedia messages.

The wireless internet module 113 supports wireless Internet access for the mobile terminal. This module may be internally or externally coupled to the mobile terminal 100.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a mobile terminal. An example of the position location module 115 may include a Global Positioning System (GPS) module. The GPS module may receive position information in cooperation with associated multiple satellites. Here, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal.

Further, the microphone 122 receives an external audio signal while the portable device is in a particular mode, such as a phone call mode, recording mode and voice recognition mode. The received audio signal is then processed and converted into digital data. In the calling mode, the processed voice data is converted and outputted into a form capable of transmitting to the mobile communication base station through the mobile communication module 112. Also, the portable device, and in particular, the A/V input unit 120, includes assorted noise removing algorithms to remove noise generated in the course of receiving the external audio signal.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. In particular, if the touch pad and a display module 151 have a layered structure therebetween, the structure can be called as a touch screen.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc. As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. The interface unit 170 may include, for example, wired/wireless headset ports, external charger ports, wired/wireless data ports, memory card ports, ports for coupling devices having an identification module, etc., audio Input/Output (I/O) ports, video I/O ports, earphone ports, and the like. Here, the identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of a smart card. Hence, the identification device can be coupled to the mobile terminal 100 via a port. Such interface unit 170 may receive data from an external device, or provided with power and accordingly transfer the received data or power to each component within the mobile terminal 100 or transfer data of the mobile terminal 100 to an external device.

The output unit 150 generally includes various components which support the output requirements of the mobile terminal 100, such as a display unit 151, an audio output module 152, an alarm 153, and the like.

The mobile terminal 100 also includes a display 151 that visually displays information associated with the mobile terminal 100. For instance, if the mobile terminal 100 is operating in a phone call mode, the display 151 will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using at least one of display technologies including, for example, a liquid crystal display (LCD), a thin film transistor-liquid crystal display (TFT-LCD), an organic light-emitting diode display (OLED), a flexible display and a three-dimensional display. The mobile terminal 100 may also include one or more of such displays. An example of a two-display embodiment is one in which one display is configured as an internal display (viewable when the terminal is in an opened position) and a second display configured as an external display (viewable in both the open and closed positions).

The audio output module 152 supports the audio output requirements of the mobile terminal 100. The audio output module 152 may be implemented using one or more speakers, buzzers, other audio producing devices, and combinations thereof. Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the alarm 153 is used to signal or otherwise identify the occurrence of a particular event associated with the mobile terminal 100. Alarm events include a call received, a message received and user input received. An example of such output includes the providing of tactile sensations (e.g., vibration) to a user. For instance, the alarm 153 may be configured to vibrate responsive to the mobile terminal 100 receiving a call or message. As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components. The signal informing the event generation may be outputted via the display 151 or the audio output module 152.

In addition, the memory 160 is used to store various types of data to support the processing, control, and storage requirements of the controller 180. Examples of such data include program instructions for applications operating on the mobile terminal 100, e.g., phonebook data, messages, pictures, video, or the like.

The memory 160 may include at least one type of storage medium including a flash memory type, a hard disk type, a multimedia card micro type, a card-type memory (e.g., SD or XD memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM) magnetic memory, a magnetic disk, an optical disk, and the like. Also, the mobile terminal 100 may cooperate with a web storage device that remotely performs the storage function of the memory 150 on the internet.

The controller 180 typically controls the overall operations of the mobile terminal 100. For instance, the controller 180 performs the control and processing associated with voice calls, data communications, instant message communications, video calls, camera operations and recording operations. In addition, the controller 180 may also include a multimedia module 181 for providing multimedia playback functions. The multimedia module 181 may be configured as part of the controller 180, or may be implemented as a separate component.

In addition, a power supply unit 190 provides power used by the various components for the portable device under the control of the controller 180. The provided power may be internal power, external power, or combinations thereof.

Various functionalities described herein may be implemented in a computer-readable medium using, for example, computer software, hardware, or any combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such functionalities may be implemented by the controller 180. For a software implementation, the functionalities such as operation procedures or functions may be implemented together with separate software modules that allow performing of at least one function or operation. Software codes can be implemented by a software application written in any suitable programming language. The software codes may be stored in the memory 160 and executed by the controller 180.

Mobile terminal 100 may include one or more display screens and may include 2 portions which flip, fold or rotate together.

Meanwhile, the mobile vehicle navigation apparatus 300 according to one embodiment of the present invention is configured to receive area update information within map update data (e.g., updated map data) before updating map data, and notify a user about the presence and/or contents of the received area update information in a graphical format (or graphical image) and/or by voice.

For instance, the mobile vehicle navigation apparatus 300 according to one embodiment of the present invention is configured to match a current map matching link, which is abstracted from map data corresponding to a traveling path from a departing place to a destination or a current traveling path without having a destination, to an estimated current position of a vehicle, and to generate road guidance information based on the matching result.

In addition, the mobile vehicle navigation apparatus 300 according to one embodiment of the present invention is configured to identify version information of map data pre-stored in the mobile terminal 100 and to request, from an information providing center through a wireless communication network, the latest version information of the map data pre-stored in the mobile terminal 100 upon request by a user or periodically, and to receive, from the information providing center, the latest version information of the map data through the wireless communication network. Then, the mobile vehicle navigation apparatus 300 compares the latest version information of the received map data with version information of map data stored in the mobile terminal 100. If the version of the map data received from the information providing center is determined to be a newer version than the version of the map data stored in the mobile terminal 100, the mobile vehicle navigation apparatus 300 receives, from the information providing center, updated area information among the map data (referred to as the 'map update data') of the new version (the latest version), and then generates graphic information indicating the received area update information and thereby to display the graphic information on a display screen. In some embodiments, the new version of map data replaces the previous version. In other embodiments, differences between the new and previous versions are identified, with the changes applied and the version number updated.

Here, the map update data, as compared to map data of a previous version, may include map data corresponding to an updated area as well as map data corresponding to a non-updated area. The graphic information may include one or more of a map background data identifier indicating a changed area of map background data, a map search data identifier indicating a changed area of map search data, and a road network identifier indicating a changed area of a road network.

Hereinafter, a configuration of a telematics terminal 200 to which the mobile vehicle navigation apparatus according to one embodiment of the present invention is interfaced is described in detail with reference to FIG. 3.

Figure 3:
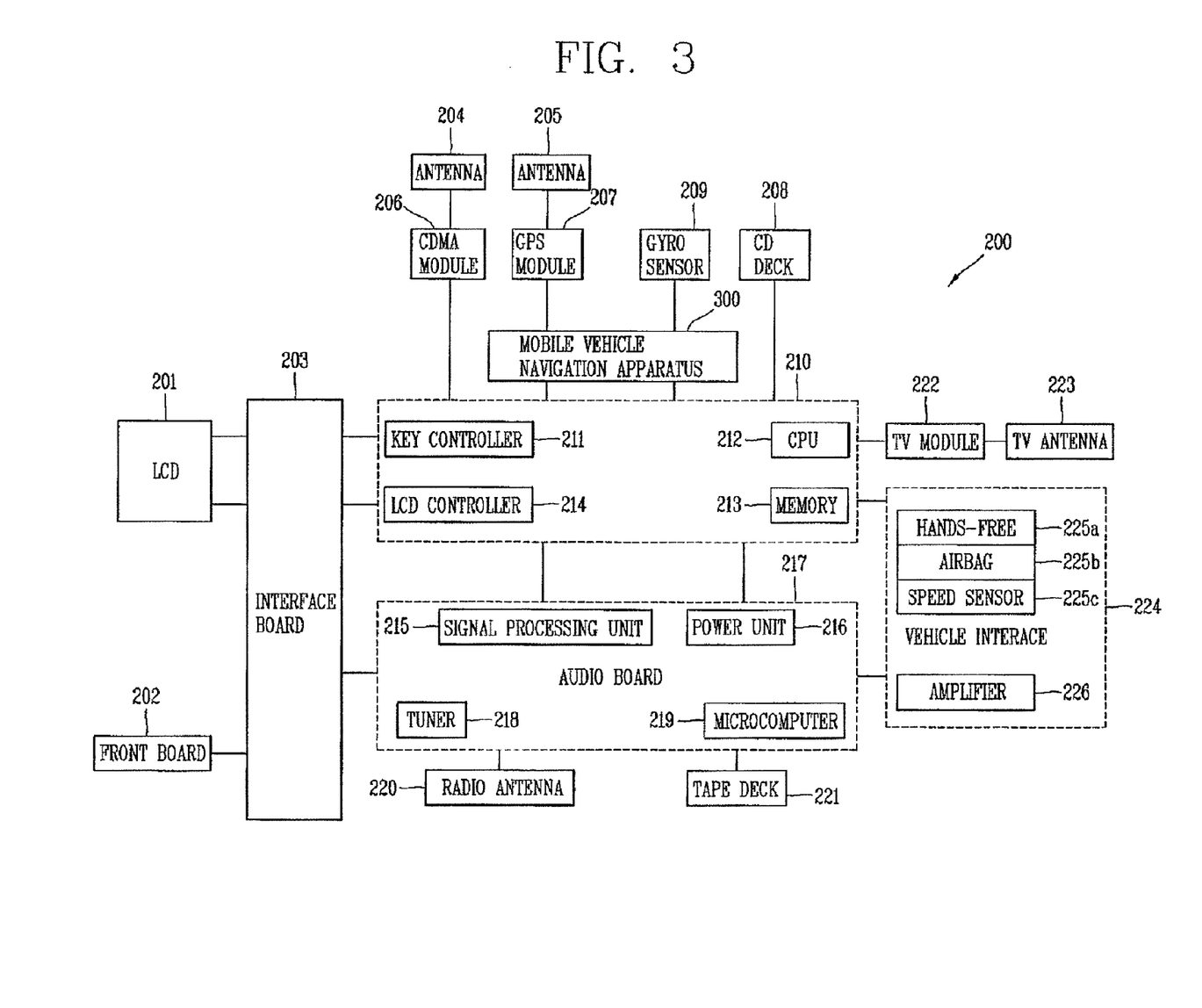
FIG. 3 is a block diagram showing a structure of a telematics terminal to which a mobile vehicle navigation apparatus according to an embodiment of the present invention is interfaced.

FIG. 3 is a block diagram showing a structure of a telematics terminal 200 to which the mobile vehicle navigation apparatus 300 according to the present invention is interfaced.

Referring to FIG. 3, the telematics terminal 200 to which the mobile vehicle navigation apparatus 300 according to the present invention is interfaced may include a central processing unit (CPU) 212 for performing overall controls of the telematics terminal 200, a memory 213 for storing a variety of information, a key controller 211 for controlling a variety of key signals, and a main board 210 having an LCD controller 214 controlling an LCD therein.

The memory 213 stores map information (map data) for displaying road guidance information on a digital map. In addition, the memory 213 stores an algorithm for controlling traffic information collection for enabling an inputting of traffic information depending on a road condition in which a vehicle is currently traveling, and information for controlling such algorithm.

The main board 210 may include a CDMA module 206 serving as a mobile communication terminal built in a vehicle with a uniquely given device number, a GPS module 207 for receiving a GPS signal to guide a position of a vehicle, track a traveling path from a departing place to a destination, etc., and for transmitting traffic information collected by a user as a GPS signal, a CD deck 208 for reproducing a signal recorded on a compact disk (CD), a gyro sensor 209 and the like. The CDMA module 206 and the GPS module 207 are configured to receive a signal through respective antennas 204 and 205.

In addition, a TV module 222 is connected to the main board 210 and receives TV signals through a TV antenna 223. The main board 210 is connected via an interface board 203 to an LCD 201 controlled by the LCD controller 214 and a front board 202 controlled by a key controller 211. The LCD 201 displays a variety of video signals and text signals, and the front board 202 is provided with buttons for enabling an inputting of a variety of key signals so as to provide to the main board 210 a key signal corresponding to a button selected by a user. The front board 202 is provided with a menu key for allowing a direct inputting of traffic information, and the menu key may be configured to be controlled by the key controller 211.

The audio board 217 is connected to the main board 210 and processes a variety of audio signals. The audio board 217 may include a microcomputer 219 for controlling the audio board 217, a tuner 218 for receiving a radio signal, a power unit 216 for supplying power to the microcomputer 219, and a signal processing unit 215 for processing a variety of voice signals.

In addition, the audio board 217 is configured to have a radio antenna 220 for receiving a radio signal and a tape deck 221 for reproducing an audio tape. The audio board 217 may further include an amplifier 226 for outputting a voice signal processed by the audio board 217.

The amplifier 226 is connected to a vehicle interface 224. That is, the audio board 217 and the main board 210 are connected to the vehicle interface 224. A hands-free unit 225a for receiving an inputting of a voice signal, an airbag status detector 225b, a speed sensor 225c for detecting a vehicle speed and the like may be connected to the vehicle interface 224. The speed sensor 225c calculates a vehicle speed, and provides the calculated vehicle speed-related information to the central processing unit 212.

Meanwhile, the mobile vehicle navigation apparatus 300 receives area update information within the map update data, and notifies the received area update information to the user in a graphical format and/or by voice.

For instance, the mobile vehicle navigation apparatus 300 matches a current map matching link, which is abstracted from map data corresponding to a traveling path from a departing place to a destination or a current traveling path without having a destination, to an estimated current position of a vehicle, and generates road guidance information based on the matching result.

In addition, the mobile vehicle navigation apparatus 300 requests, from an information providing center through a wireless communication network, the latest version information of map data corresponding to map data that is pre-stored in the telematics terminal 200 upon request by a user or periodically, and receives, from the information providing center, the latest version information of the map data through the wireless communication network. Then, the mobile vehicle navigation apparatus 300 compares the latest version information of the received map data with version information of map data stored in the telematics terminal 200, and, if the version of the map data received from the information providing center is determined to be a newer version than the version of the map data stored in the telematics terminal 200, receives, from the information providing center, updated area information among the map data (referred to as the 'map update data') of the newer version (the latest version), and then generates graphic information indicating the received area update information and thereby to display the graphic information on a display screen. Here, the graphic information may include one or more of a map background data identifier indicating a changed area of map background data, a map search data identifier indicating a changed area of map search data, and a road network identifier indicating a changed area of a road network.

Here, the functions of the mobile vehicle navigation apparatus 300 according to one embodiment of the present invention may be performed by the mobile vehicle navigation apparatus 300 itself, however, also be performed by the central processing unit 212 of the telematics terminal 200.

Hereinafter, detailed descriptions of a configuration of the mobile vehicle navigation apparatus 300 according to one embodiment of the present invention will be given with reference to FIG. 4.

Figure 4:
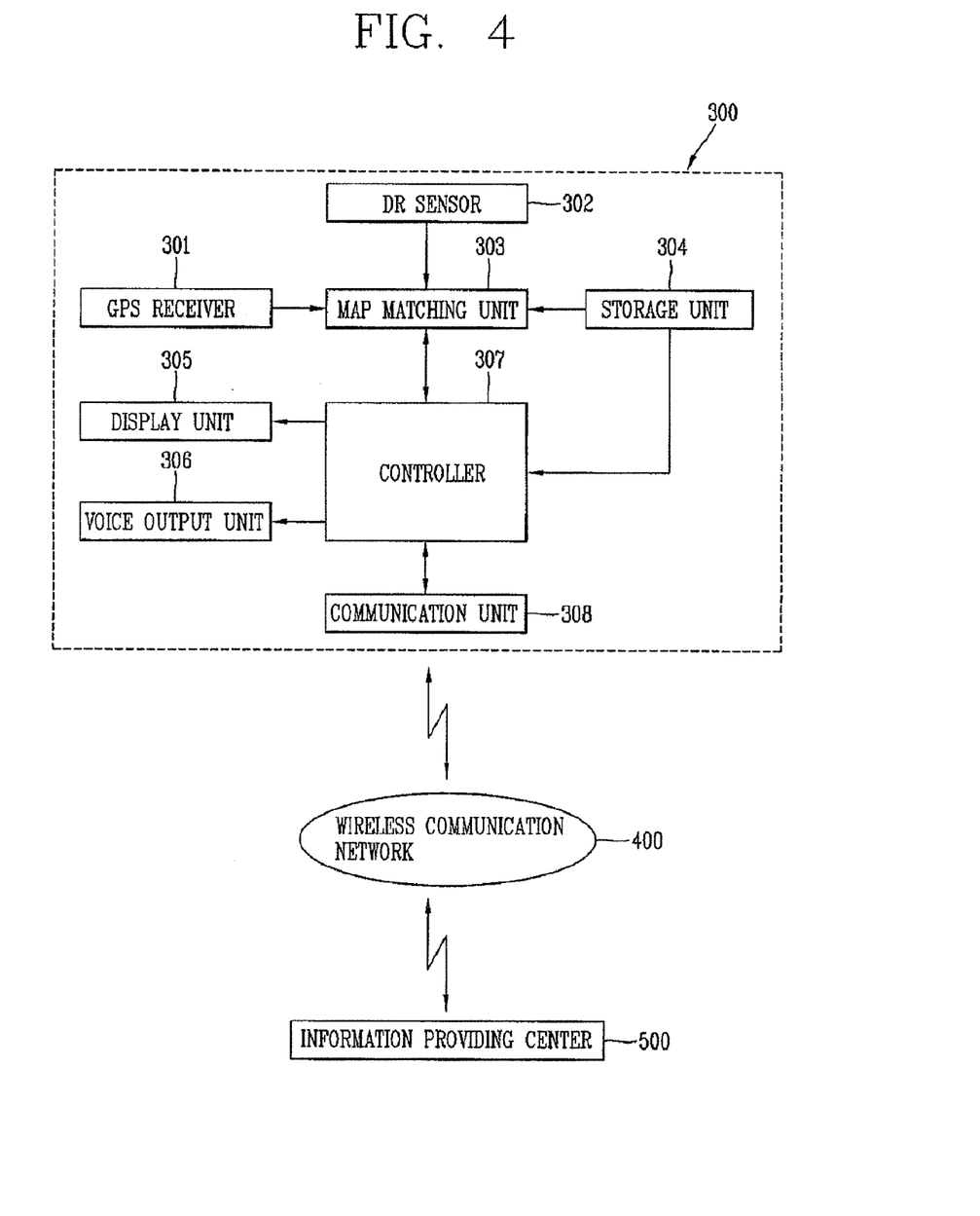
FIG. 4 is a block diagram showing a structure of a mobile vehicle navigation apparatus according to one embodiment of the present invention.

FIG. 4 is a block diagram showing a structure of a mobile vehicle navigation apparatus according to one embodiment of the present invention.

Referring to FIG. 4, the mobile vehicle navigation apparatus according to one embodiment of the present invention may include a GPS receiver 301 for receiving a Global Positioning System (GPS) signal received from a satellite and generating first vehicle position data of a mobile vehicle navigation apparatus (assumed to be in the same position as the vehicle) based on the received GPS signal; a Dead-Reckoning (DR) sensor 302 for generating second vehicle position data based on a traveling direction of a vehicle and the vehicle speed; a storage unit 304 for storing map data; a map matching unit 303 for generating an estimated vehicle position based on the first vehicle position data and the second vehicle position data, and matching the generated vehicle position to a link (map matching link or map matching road) in the map data stored in the storage unit 304 and thereby to output the matched map information (map matching result); a controller 307 for generating road guidance information based on the matched map information, and if a version of the map data received from the information providing center 500 is determined to be a newer version than a version of the map data stored in the storage unit 304, receiving updated area information among the map data of the newer version (the latest version) through the communication unit 308, and then generating graphic information and/or voice information indicating the received area update information; a display unit 305 for displaying road guidance map included in the road guidance information or displaying the graphic information on a display screen; and a voice output unit 306 for outputting road guidance voice information (road guidance voice message) included in the road guidance information or outputting the voice information.

The controller 307 applicable to the mobile vehicle navigation apparatus according to one embodiment of the present invention receives updated area information among the map data of the newer version (the latest version) through the communication unit 308 if the version of the map data received from the information providing center 500 is determined to be the newer version than the version of the map data stored in the storage unit 304, and then generates graphic information and/or voice information notifying the received area update information. Accordingly, the mobile vehicle navigation method and apparatus thereof according to the embodiments of the present invention may output graphic information and/or voice information for notifying updated area information before updating map data, thereby allowing the user to rapidly determine whether to update map data of a corresponding area as well as to update map data only of an area required by the user among the map data.

Here, the GPS receiver 301 may be implemented as the GPS module 207 of the telematics terminal 200, and the storage unit 304 may be implemented as the memory 213 of the telematics terminal 200. The display unit 305 may be the LCD 201 of the telematics terminal 200, and the voice output unit 306 may be the amplifier 226 of the telematics terminal 200. In addition, respective functions of the map matching unit 303 and the controller 307 may be performed by the central processing unit 212 of the telematics terminal 200.

The technique for generating the estimated vehicle position based on the first vehicle position data generated by the GPS receiver 301 and the second vehicle position data generated by the DR sensor 302 is a well-known technique, and detailed explanations therefore are omitted.

Hereinafter, a structure of the mobile vehicle navigation apparatus according to one embodiment of the present invention will be described in detail with reference to FIG. 4.

First, when the road guidance mode is selected, the GPS receiver 301 receives a GPS signal received from a satellite, and generates first vehicle position data in real time based on longitude and latitude coordinates included in the received GPS signal and thereby to output the first vehicle position data to the map matching unit 303. Here, the position information of the vehicle may be received through the GPS receiver 301 as well as Wi-Fi or Wibro communication.

The DR sensor 302 generates second vehicle position data based on a traveling direction of a vehicle and the vehicle speed, and outputs the second vehicle position data to the map matching unit 303.

The map matching unit 303 generates an estimated vehicle position based on the first vehicle position data and the second vehicle position data, and matches the generated vehicle position to the map data and thereby to output the matched map information (map matching result) to the controller 307. For instance, the map matching unit 303 generates the estimated vehicle position based on the first vehicle position data and the second vehicle position data, matches the generated vehicle position and the links in the map data stored in the storage unit 304 according to a link sequence, and then outputs the matched map information (map matching result) to the controller 307.

The controller 307 generates road guidance information based on the matched map information, and outputs the generated road guidance information to the display unit 305 and the voice output unit 306. Here, the voice output unit 306 may be implemented as a speaker.

Meanwhile, the controller 307 requests, from the information providing center 500, the latest version information of map data that corresponds to the map data that is pre-stored in the storage unit 304 through the wireless communication network 400 upon request (selection) by a user or periodically.

The controller 307 receives the latest version information of the map data from the information providing center 500 through the wireless communication network 400, and compares the latest version information of the received map data with the version information of the map data pre-stored in the storage unit 304. Here, if the version of the map data received from the information providing center 500 is determined to be a newer version than the version of the map data pre-stored in the storage unit 304, the controller 307 receives updated area information among the map data (referred to as the 'map update data') of the newer version (the latest version) from the information providing center 500 through the communication unit 308.

Having received the updated area information, the controller 307 generates graphic information indicating the received area update information, and outputs the generated graphic information to the display unit 305. Based on the updated area information, the controller 307 generates graphic information including one or more of a map background data identifier for indicating a changed area on map background data, a map search data identifier for indicating a changed area on map search data, and a road network identifier for indicating a changed area on a road network.

The map background data identifier is an identifier indicating an area where its background has been changed within the map data. For instance, map background data identifier may indicate a background of a specific area has been changed due to a newly built or removed building, or the like. The map search data identifier is an identifier used for searching for a map. For instance, map search data identifier may indicate that map search data of a specific area has been changed due to a point of interest (POI), a change of address, a change of a telephone number or the like. The road network identifier is an identifier indicating that a road of a specific area has been changed due to a newly constructed or closed road, a road under construction or the like.

In addition, the controller 307 may display one or more of the map background data identifier, the map search data identifier and the road network identifier on the display screen in the form of one or more of a color, an icon, an avatar, a pattern and a symbol.

The display unit 305 receives the graphic information and displays the received graphic information on the display screen. Here, the display unit 305 may be implemented as a touch screen.

Then, the controller 307 determines whether or not one or more of the identifiers (e.g., the background data identifier, the search data identifier and the road network identifier) in the graphic information have been selected by the user. Here, the user may use the touch screen or the input unit (e.g., reference numeral 130 in FIG. 2) to select one or more of the above identifiers.

If one or more of the background data identifier, the search data identifier and the road network identifier of the graphic information has been selected, the controller 307 requests, from the information providing center 500, map data corresponding to the selected identifier through the communication unit 308.

The information providing center 500 transmits the map update data requested by the controller 307 through the wireless communication network 400.

The controller 307 receives the map update data transmitted from the information providing center 500 through the communication unit 308, and then stores the received map update data in the storage unit 304. Here, the map data is updated by overwriting the map update data in the storage unit 304.

Meanwhile, the controller 307 may generate voice information indicating the received area update information, and output the generated voice information to the voice output unit 306. For instance, the controller 307 may generate voice information, saying "a background of a specific area has been changed" when the received area update information indicates a changed area on the background data. If the received area update information indicates a changed area on the map search data, voice information, saying "map search data of a specific area has been changed" may be generated. And, if the received area update information indicates a changed area on the road network, voice information, saying "a road network of a specific area has been changed" may be generated.

Hereinafter, the mobile vehicle navigation method according to one embodiment of the present invention will be described in detail with reference to FIGS. 4 and 5.

Figure 5:
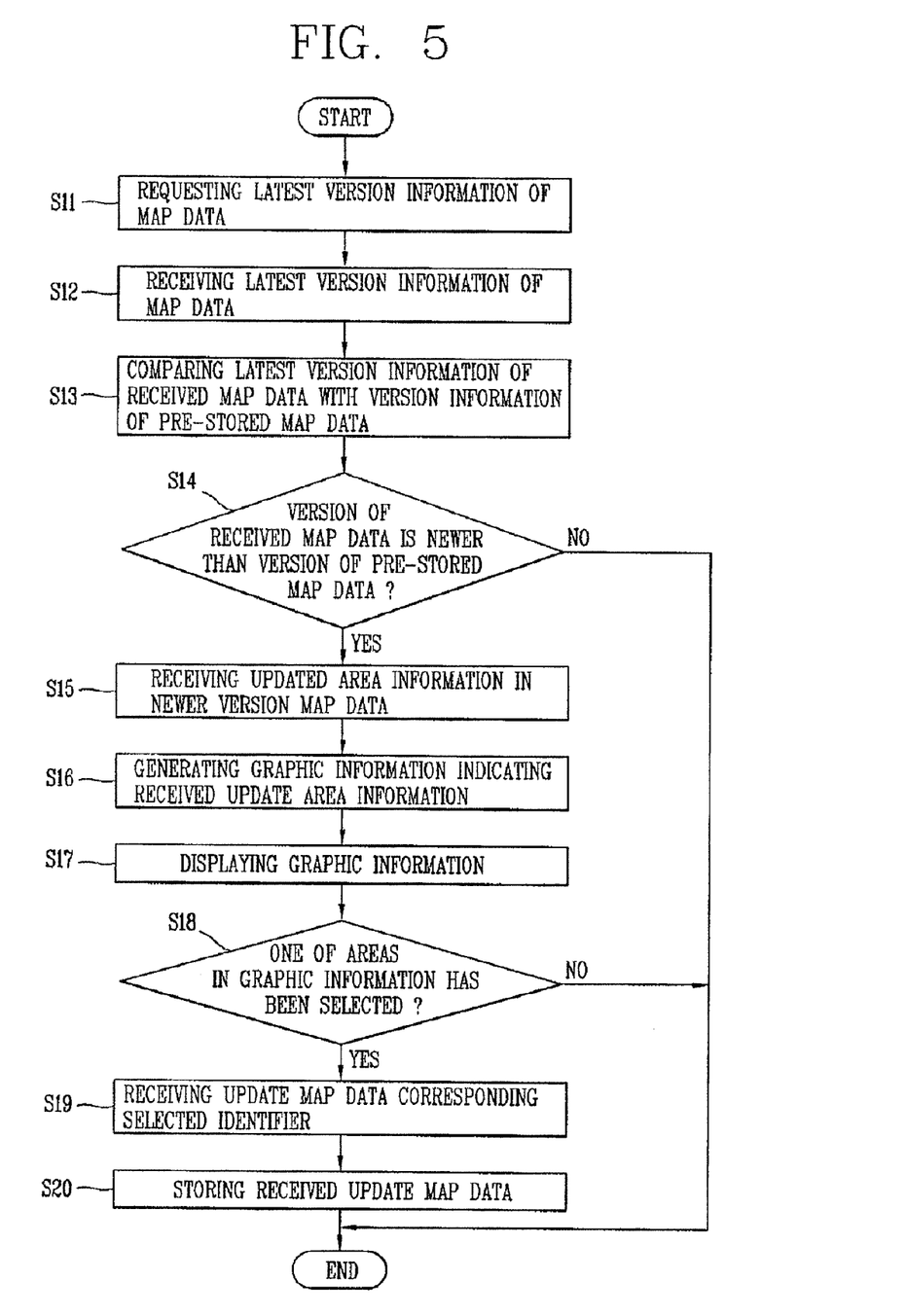
FIG. 5 is a flowchart showing a mobile vehicle navigation method according to one embodiment of the present invention.

FIG. 5 is a flowchart showing a mobile vehicle navigation method according to one embodiment of the present invention.

First, the map matching unit 303 generates an estimated vehicle position based on the first vehicle position data and the second vehicle position data, and reads map data corresponding to a traveling path from the storage unit 304. Here, the traveling path may be a traveling path from a departing place to a destination or a traveling path without selecting the destination.

The map matching unit 303 matches the estimated vehicle position to a link (road) included in the map data, and then outputs the matched map information (map matching result) to the controller 307. For instance, the map matching unit 303 generates the estimated position of the vehicle based on the first and second vehicle position data, matches the generated vehicle position to the links in the map data stored in the storage unit 304 according to a link sequence, and then outputs the matched map information (map matching result) to the controller 307.

The controller 307 generates road guidance information based on the matched map information, and outputs the generated road guidance information to the display unit 305 and the voice output unit 306. Here, the voice output unit 306 outputs the road guidance information in a voice signal.

The controller 307 requests, from the information providing center 500, the latest version information of map data that corresponds to the map data that is pre-stored in the storage unit 304 through the wireless communication network 400 upon request by a user or periodically (S11).

The controller 307 receives the latest version information of the map data from the information providing center 500 through the wireless communication network 400 (S12), and compares the latest version information of the received map data with the version information of the map data pre-stored in the storage unit 304 (S13). Here, if the version of the map data received from the information providing center 500 is determined to be a newer version than the version of the map data pre-stored in the storage unit 304 (S14), the controller 307 receives updated area information among the map data (referred to as the 'map update data') of the newer version (the latest version) from the information providing center 500 through the communication unit 308 (S15).

Based on the received area update information, the controller 307 generates graphic information indicating the received area update information (S16), and outputs the generated graphic information to the display unit 305. The graphic information includes a background data identifier for indicating a changed area on background data, a search data identifier for indicating a changed area on search data, and a road network identifier for indicating a changed area on a road network.

The display unit 305 receives the graphic information and displays the received graphic information on the display screen (S17). Here, the display unit 305 may be implemented as a touch screen. Here, the graphic information displayed on the display screen will be described with reference to FIG. 6.

Figure 6:
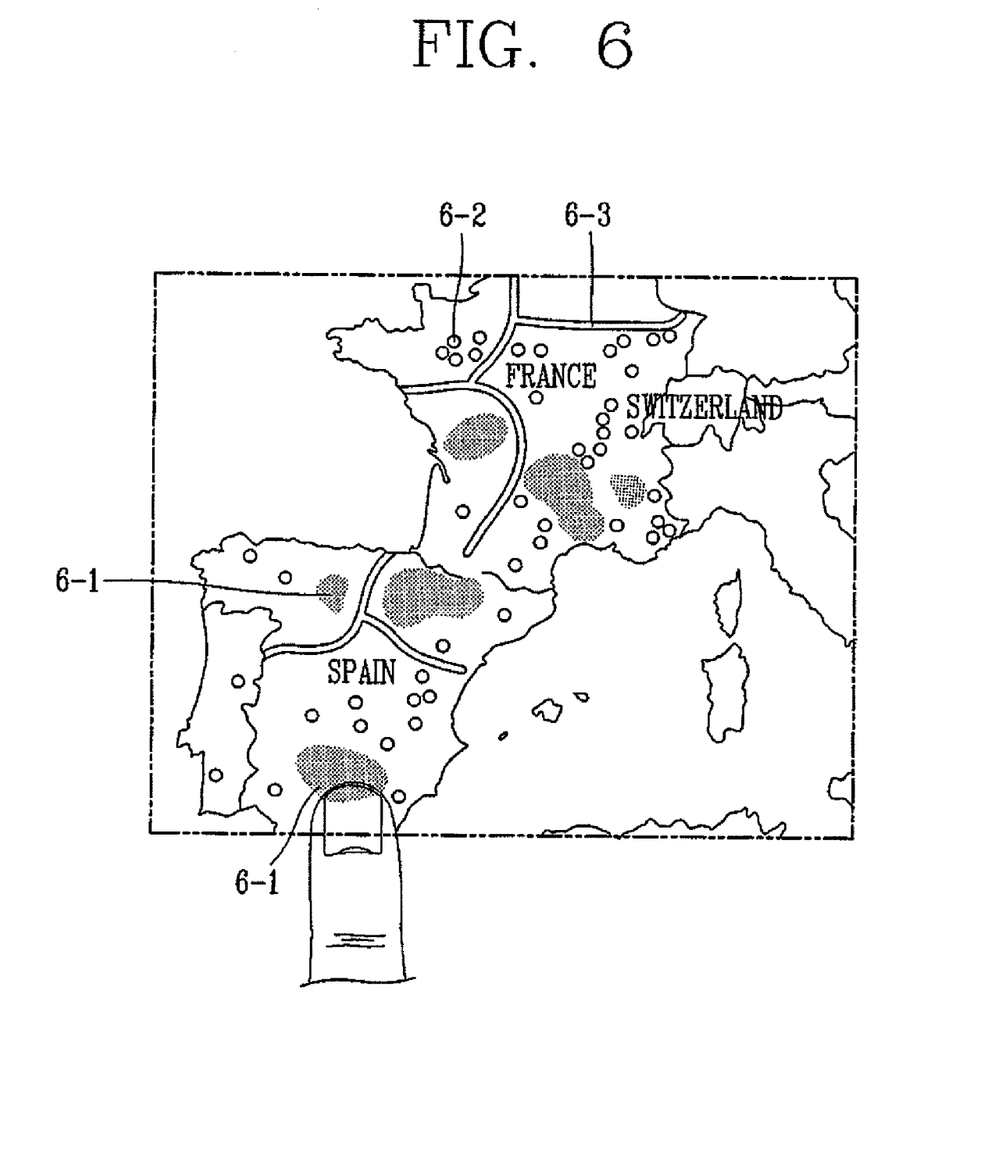
FIG. 6 is a view showing graphic information indicating updated area information according to one embodiment of the present invention.

FIG. 6 is a view showing graphic information indicating updated area information according to one embodiment of the present invention.

Referring to FIG. 6, the controller 307 may display the background data identifier 6-1 in green, the search data identifier 6-2 in yellow, and the road network identifier 6-3 in red on the display screen. Here, the controller 307 may display such identifiers (e.g., the background data identifier 6-1, the search data identifier 6-2 and the road network identifier 6-3) in various different colors as well as using one or more of icons, avatars, patterns and symbols on the display screen.

Next, the controller 307 determines whether or not one or more of the above identifiers in the graphic information (the background data identifier 6-1, the search data identifier 6-2 and the road network identifier 6-3) has been selected (S18).

When one or more of the identifiers in the graphic information has been selected, the controller 307 requests, from the information providing center 500, map update data corresponding to the selected identifier through the communication unit 308. For instance, when the background data identifier has been selected by the user, the controller 307 requests, from the information providing center 500, background update data corresponding to the selected background data identifier via the communication unit 308. When the search data identifier has been selected, the controller 307 requests, from the information providing center 500, search update data corresponding to the selected search data identifier via the communication unit 308. When the road network identifier has been selected, the controller 307 requests, from the information providing center 500, updated road network data corresponding to the selected road network identifier via the communication unit 308.

The information providing center 500 transmits the requested map update data to the controller 307 through the wireless communication network 400. For instance, the information providing center 500 transmits to the controller 307 one or more of the background update data corresponding to the background data identifier, the search update data corresponding to the search data identifier, and the road update network data corresponding to the road network identifier through the communication unit 308.

The controller 307 receives the map update data transmitted from the information providing center 500 through the communication unit 308 (S19), and then stores the received map update data in the storage unit 304 (S20). The map data is updated by overwriting the map update data in the storage unit 304.

Therefore, the mobile vehicle navigation method and apparatus thereof according to the embodiments of the present invention may display the graphic information indicating any update information before updating the map data on the display screen, thereby allowing the user to rapidly determine whether to update the map data. In addition, the mobile vehicle navigation method and apparatus thereof according to the embodiments of the present invention may allow the user to select desired update area information only in the graphic information (or graphical image), thereby easily and rapidly updating the map data desired by the user.

Hereinafter, the mobile vehicle navigation method according to another embodiment of the present invention will be described in detail with reference to FIGS. 4 through 9. That is, a method for enlarging or reducing a selected specific area when the specific area in the area update information displayed in a graphical format is selected will be described in detail.

Figure 7:
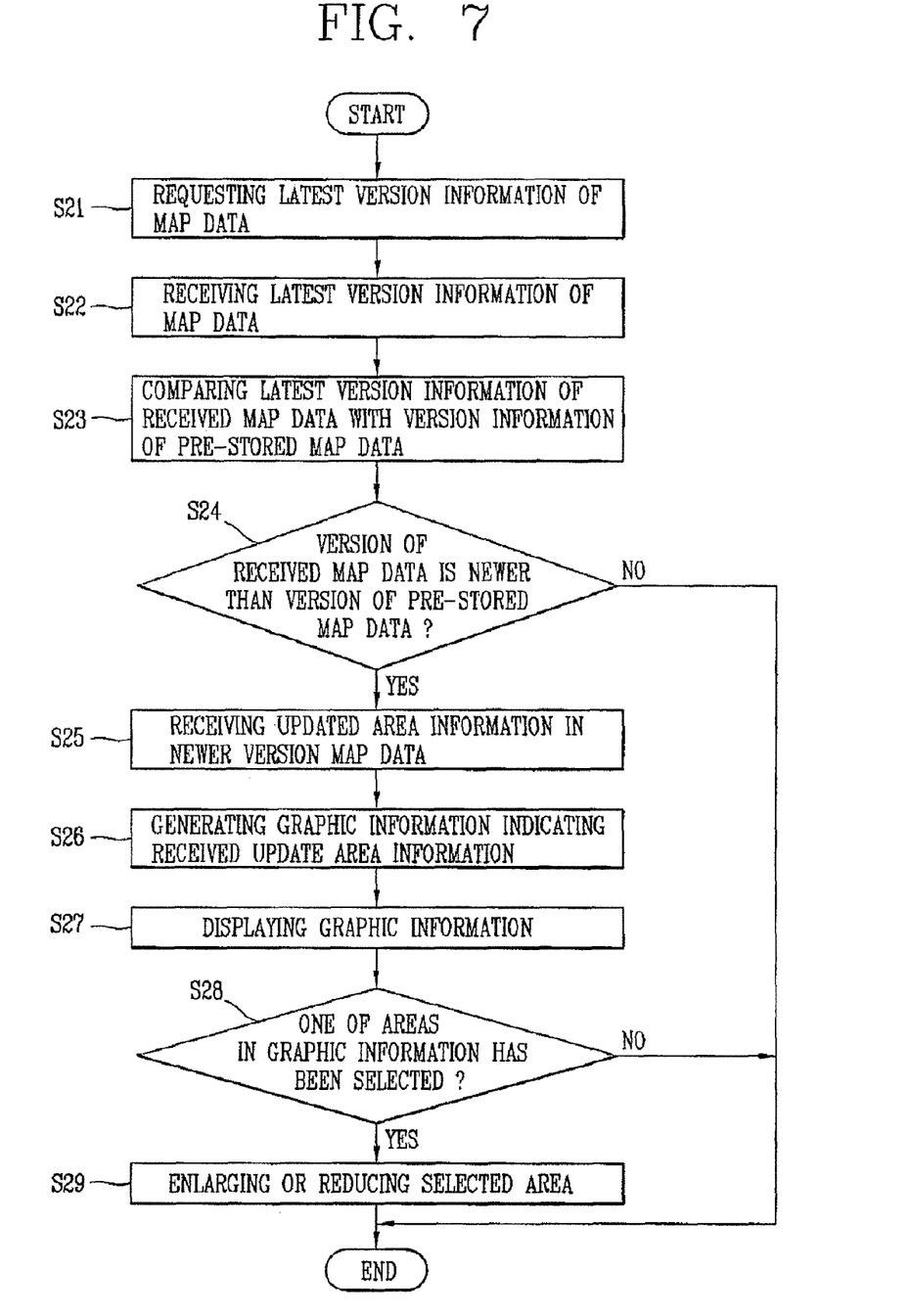
FIG. 7 is a flowchart showing a mobile vehicle navigation method according to another embodiment of the present invention.

FIG. 7 is a flowchart showing a mobile vehicle navigation method according to another embodiment of the present invention.

First, the controller 307 requests, from the information providing center 500, the latest version information of map data that corresponds to the map data that is pre-stored in the storage unit 304 through the wireless communication network 400 upon request by a user or periodically (S21).

The controller 307 receives the latest version information of the map data from the information providing center 500 through the wireless communication network 400 (S22), and compares the latest version information of the received map data with the version of the map data pre-stored in the storage unit 304 (S23). Here, if the version of the map data received from the information providing center 500 is determined to be the newer version than the version of the map data pre-stored in the storage unit 304 (S24), the controller 307 receives updated area information among the map data (referred to as the 'map update data') of the newer version (the latest version) from the information providing center 500 through the communication unit 308 (S25).

The controller 307 generates graphic information indicating the received area update information (S26), and outputs the generated graphic information to the display unit 305. The graphic information includes a background data identifier for indicating a changed area on background data, a search data identifier for indicating a changed area on search data, and a road network identifier for indicating a changed area on a road network.

The display unit 305 receives the graphic information and displays the received graphic information on the display screen (S27). Here, the display unit 305 may be implemented as a touch screen.

Then, the controller 307 determines whether any of the areas within the graphic information (e.g., Spain, France, Portugal, Luxembourg and Switzerland in Europe) has been selected (S28).

If a specific area (e.g., Spain) among the areas within the graphic information has been selected, the controller 307 enlarges or reduces the selected area (S29). For instance, when the specific area among the areas within the graphic information has been selected, the controller 307 enlarges the selected specific area. When the specific area has been re-selected, the controller 307 reduces the selected specific area. Accordingly, the user may easily recognize and select map data to be updated.

Hereinafter, a method for enlarging/reducing a graphic image displayed on the display screen will be described in detail with reference to FIG. 8.

Figure 8:
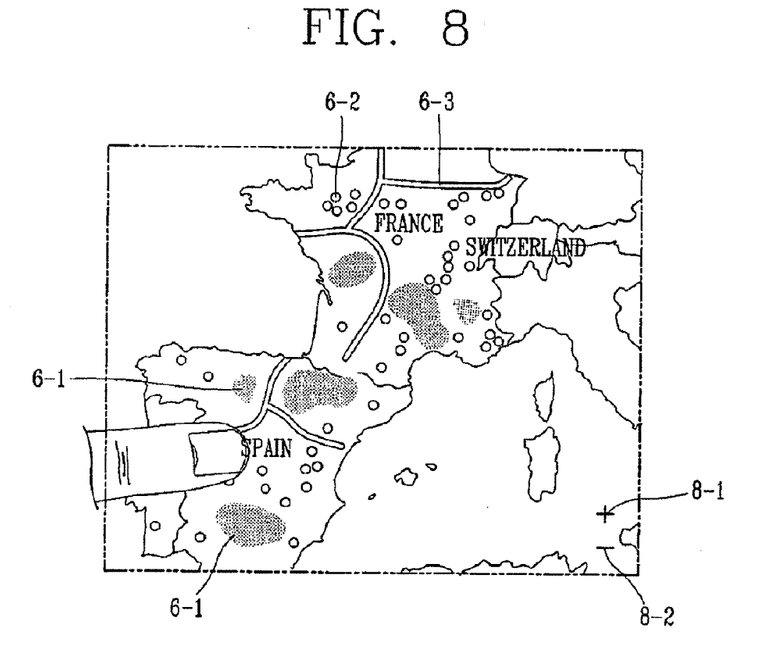
FIG. 8 is a view showing graphic information indicating updated area information according to another embodiment of the present invention.

FIG. 8 is a view showing graphic information indicating updated area information according to another embodiment of the present invention.

Referring to FIG. 8, the controller 307 enlarges a graphic image indicating the area update information when an enlarging key 8-1 displayed on the display screen together with the graphic information is selected by the user, and reduces the graphic image indicating the area update information when a reducing key 8-2 is selected by the user. Accordingly, the user may accurately check any changed area by enlarging/reducing the graphic image indicating the area update information.

Figure 9:
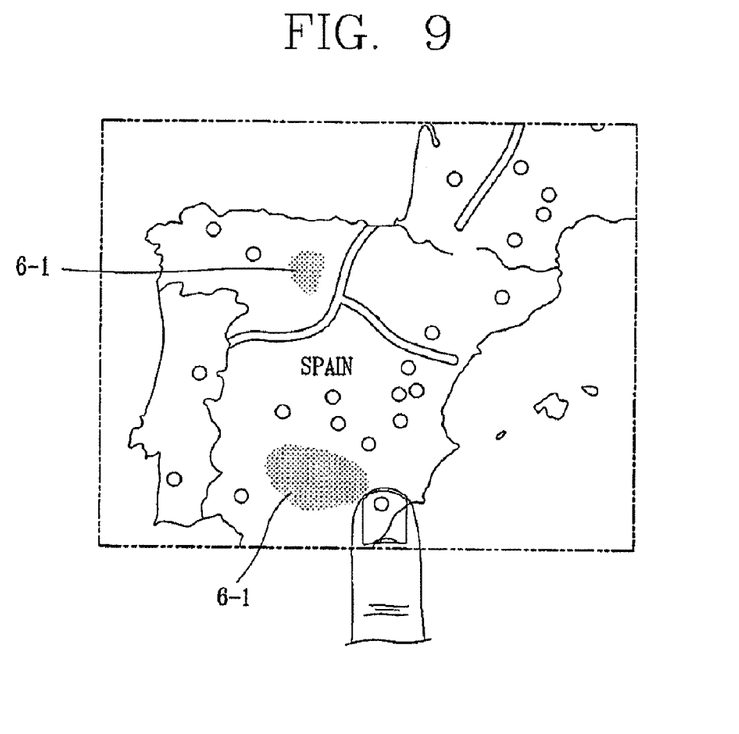
FIG. 9 is an enlarged view showing graphic information indicating updated area information according to another embodiment of the present invention.

FIG. 9 is an enlarged view showing graphic information indicating updated area information according to another embodiment of the present invention.

In addition, if the touch screen is implemented and when a specific area (e.g., Spain) on the display screen has been touched by the user, the controller 307 enlarges the touched area and displays detailed area update information of the enlarged area. For instance, if the area 'Spain' on the graphic information has been touched by the user, the controller 307 enlarges the touched area 'Spain' only on the entire display screen as well as displays any detailed area update information for the area 'Spain' in the form of the identifiers (the background data identifier, the search data identifier and the road network identifier) on the display screen. If the specific area is touched again, the controller 307 reduces the specific area.

As so far described, the mobile vehicle navigation method and apparatus thereof according to the embodiments of the present invention generates graphic information and/or voice information for notifying any area update information before updating the map data, thereby allowing the user to rapidly determine whether to update the map data.

The mobile vehicle navigation method and apparatus thereof according to the embodiments of the present invention generates graphic information and/or voice information for notifying any area update information before updating the map data, thereby updating map data only of an area desired by the user in the map data.

The mobile vehicle navigation method and apparatus thereof according to the embodiments of the present invention enlarges/reduces a specific area if the specific area has been selected among the areas within the graphic information, thereby enabling the user to accurately recognize any map data to be updated.

The mobile vehicle navigation method and apparatus thereof according to the embodiments of the present invention may also be applied to telematics terminals and mobile communication terminals as well as mobile terminals including Personal Digital Assistants (PDA), Portable Multimedia Player (PMP) and the like.

The navigation device described in the preceding paragraphs may be installed in any type of mobile vehicle including an automobile, a truck, a bus, a boat, etc.

The foregoing embodiments and advantages are merely exemplary and are not to be construed as limiting the present disclosure. The present teachings can be readily interfaced to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of updating map data of a navigation device configured to be installed in one of a mobile terminal and a motor vehicle, comprising:

receiving information relating to an area update of the map data from a data server via a wireless broadcast to the navigation device; and displaying the information in graphical form on a map displayed on a display screen, wherein the step of displaying the information in graphical form comprises displaying, on a first area of the map corresponding to the area update, a changed area icon, while simultaneously displaying an icon-free second area of the map corresponding to an area not addressed in the area update, and wherein the method further comprises:
receiving a user input to the changed area icon to select the first area of the map corresponding to the area update;
wirelessly transmitting to the data server a map update request that includes information identifying the first area;
wirelessly receiving version information of available map data corresponding to the first area from the data server;
comparing the version information of the available map data with version information of previously stored map data corresponding to the first area;
receiving updated map data when a version of the available map data is newer than a version of the previously stored map data; and
updating at least one of the changed area icon and the icon-free second area on the map based on the updated map data.

2. The method of claim 1, wherein the navigation device is configured to be installed in a mobile vehicle.

3. The method of claim 1, further comprising:
audibly announcing a receipt of the information relating to the area update.

4. The method of claim 1, wherein the step of displaying the information in graphical form further comprises at least one of:
displaying a map search data identifier indicating a changed searchable data element on a corresponding area of the map; and
displaying a road network identifier indicating a changed road network on a corresponding area of the map.

5. The method of claim 1, further comprising:
enlarging or reducing the selected area in response to the user input.

6. A navigation device configured to be installed in one of a mobile terminal and a motor vehicle, the navigation device configured to display map data, comprising:
a display;
a wireless communication device;
a memory; and
a controller operatively connected to the display, wireless communication device and memory, the controller configured to
receive information relating to an area update of the map data from a data server via a wireless broadcast,
display the information in graphical form on a map on the display by displaying, on a first area of the map corresponding to the area update, a changed area icon, while simultaneously displaying an icon-free second area of the map corresponding to an area not addressed in the area update,
receive a user input to the changed area icon to select the first area of the map corresponding to the area update,
wirelessly transmit to the data server a map update request that includes information identifying the first area,
wirelessly receive from the data server version information of available map data corresponding to the first area,
compare the version information of the available map data with version information of previously stored map data corresponding to the first area,
receive updated map data when a version of the available map data is newer than a version of the previously stored map data, and
update at least one of the changed area icon and the icon-free second area on the map based on the updated map data.

7. The navigation device of claim 6, wherein the navigation device is configured to be installed in a vehicle.

8. The navigation device of claim 6, wherein the controller is configured to audibly announce a receipt of the information relating to the area update.

9. The navigation device of claim 6, wherein the controller is configured to display at least one of
a map search data identifier indicating a changed searchable data element on a corresponding area of the map; and
a road network identifier indicating a changed road network on a corresponding area of the map.

10. The navigation device of claim 6, wherein the controller is configured to enlarge or reduce the selected area in response to the user input.

11. A motor vehicle, comprising:
a navigation device configured to display map data, the navigation device including:
a display;
a wireless communication device;
a memory; and
a controller operatively connected to the display, wireless communication device and memory, the controller configured to
receive information relating to an area update of the map data from a data server via a wireless broadcast,
display the information in graphical form on a map on the display by displaying, on a first area of the map corresponding to the area update, a changed area icon, while simultaneously displaying an icon-free second area of the map corresponding to an area not addressed in the area update,
receive a user input to the changed area icon to select the first area of the map corresponding to the area update,
wirelessly transmit to the data server a map update request that includes information identifying the first area,
wirelessly receive from the data server version information of available map data corresponding to the first area,
compare the version information of the available map data with version information of previously stored map data corresponding to the first area,
receive updated map data when a version of the available map data is newer than a version of the previously stored map data, and
update at least one of the changed area icon and the icon-free second area on the map based on the updated map data.

* * * * *